(12) United States Patent
Arulandu et al.

(10) Patent No.: US 11,632,173 B2
(45) Date of Patent: Apr. 18, 2023

(54) METHOD AND SYSTEM FOR COMMUNICATING VIA LIGHT SIGNALS

(71) Applicant: SIGNIFY HOLDING B.V., Eindhoven (NL)

(72) Inventors: Kumar Arulandu, Breda (NL); Johan-Paul Marie Gerard Linnartz, Eindhoven (NL); Michel Germe, Cormelles le Royal (FR); Andries Van Wageningen, Wijlre (NL); Stephanus Joseph Johannes Nijssen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 108 days.

(21) Appl. No.: 17/430,070

(22) PCT Filed: Feb. 10, 2020

(86) PCT No.: PCT/EP2020/053271
§ 371 (c)(1),
(2) Date: Aug. 11, 2021

(87) PCT Pub. No.: WO2020/169378
PCT Pub. Date: Aug. 27, 2020

(65) Prior Publication Data
US 2022/0140901 A1 May 5, 2022

(30) Foreign Application Priority Data
Feb. 18, 2019 (EP) ...................................... 19157705

(51) Int. Cl.
*H04B 10/116* (2013.01)

(52) U.S. Cl.
CPC ................................. *H04B 10/116* (2013.01)

(58) Field of Classification Search
CPC .................................................... H04B 10/116
(Continued)

(56) References Cited

U.S. PATENT DOCUMENTS 5,781,135 A 7/1998 Kim et al.
9,198,262 B1 * 11/2015 Bosua .................... H05B 45/60
(Continued)

FOREIGN PATENT DOCUMENTS

JP  2006020294 A  1/2006
JP  2008311845 A  12/2008
(Continued)

*Primary Examiner* — Dalzid E Singh (57) ABSTRACT

A system comprising: a plurality of first devices, each configured to transmit a low-frequency, LF, light signal comprising an identifier of the respective first device, and to transmit and/or receive a high-frequency, HF, light signal comprising data content; and a second device configured to receive a LF light signal from each of the first devices, and to transmit and/or receive a HF light signal from at least one first device, wherein the second device has an adaptable receiving and/or transmitting direction for respectively receiving and/or transmitting the HF light signal, and wherein the second device comprises a controller configured to: based on the identifiers encoded in the LF light signals, determine a position of the second device relative to the first devices and select a first device; and based on the determination, adapt the receiving and/or transmitting direction toward the selected first device.

14 Claims, 6 Drawing Sheets

(58) Field of Classification Search
USPC .......................................................... 398/118
See application file for complete search history.

(56) References Cited

U.S. PATENT DOCUMENTS

| | | |
|---|---|---|
| 9,361,630 B1 * | 6/2016 | Goswami .............. H04W 4/021 |
| 10,158,425 B2 | 12/2018 | Agrawal et al. |
| 2008/0044188 A1 * | 2/2008 | Kagawa ............. H04B 10/1141 |
| | | 398/128 |
| 2009/0208221 A1 * | 8/2009 | Sasai .................... H04B 10/116 |
| | | 398/118 |
| 2010/0232799 A1 | 9/2010 | Lueck |
| 2011/0080120 A1 | 4/2011 | Talstra et al. |
| 2013/0279917 A1 | 10/2013 | Son et al. |
| 2014/0086587 A1 | 3/2014 | Roberts et al. |
| 2015/0147067 A1 * | 5/2015 | Ryan ................... H04B 10/116 |
| | | 398/118 |
| 2017/0041071 A1 | 2/2017 | Ryan et al. |
| 2017/0219684 A1 * | 8/2017 | Jovicic ................ H04W 64/006 |
| 2018/0076891 A1 | 3/2018 | Agrawal et al. |
| 2018/0212679 A1 | 7/2018 | Shim et al. |

FOREIGN PATENT DOCUMENTS

| | | |
|---|---|---|
| WO | 2006013755 A1 | 2/2006 |
| WO | 2015153371 A1 | 10/2015 |
| WO | 2017089199 A1 | 6/2017 |
| WO | 2018005906 A1 | 1/2018 |
| WO | 2018215989 A1 | 11/2018 |

* cited by examiner

METHOD AND SYSTEM FOR COMMUNICATING VIA LIGHT SIGNALS

CROSS-REFERENCE TO PRIOR APPLICATIONS

This application is the U.S. National Phase application under 35 U.S.C. § 371 of International Application No. PCT/EP2020/053271, filed on Feb. 10, 2020, which claims the benefit of European Patent Application No. 19157705.5, filed on Feb. 18, 2019. These applications are hereby incorporated by reference herein.

TECHNICAL FIELD

The present disclosure relates to a method and a system for communicating between first (e.g. transmitting) devices and second (e.g. receiving) devices, wherein at least the transmitting devices are configured to transmit data content via light signals. In particular, the present disclosure relates to adapting a receiving and/or transmitting direction of the second device toward one of the first devices for respectively receiving and/or transmitting light signals.

BACKGROUND

Light Fidelity (Li-Fi) refers to techniques whereby information is communicated in the form of a signal embedded in visible light, infrared light or ultraviolet light emitted by a light source. Such techniques are sometimes also referred to as coded light, visible light communication (VLC) or free-space optical communication (FSO).

The encoding of signals into light can be used in a variety of possible applications. For instance a different respective ID can be embedded into the illumination emitted by each of the transmitters (e.g. luminaires) in a given environment, e.g. those in a given building, such that each ID is unique at least within the environment in question. E.g. the unique ID may take the form of a unique modulation frequency or unique sequence of symbols. A device receiving the ID can then use it to look up some information mapped to that ID via another network, such as an RF network (e.g. WLAN, or cellular network, etc.). For instance, one application is to provide information from a luminaire to a remote control unit for control purposes, or to provide status information on the transmitting device (e.g. to report errors, warnings, temperature, operating time, etc.). In other example applications, the signals can be used to provide location dependent information (e.g. advertising, or information on museum exhibitions, etc.); or to perform localization (e.g. triangulation, trilateration or multi-lateration) based on beacon signals embedded in the emitted from luminaires.

U.S. Pat. No. 10,158,425 B2 discloses methods and system for commissioning light fixtures, wherein an encoded light signal is decoded to obtain an identifier associated with a light fixture allowing a correspondence between the identifier and a plurality of location of light fixtures to be determined. US 2018/0212679 A1 discloses a terminal for visible light communication that can use either the illuminance sensor or the image sensor for receiving. US 2017/0041071 A1 discloses a node with a light source emitting a modulated light and a radio frequency transceiver disposed therewith, wherein a mobile device may communicate with the node using the radio-frequency transceiver.

In more recent years as Li-Fi bandwidths have increased, it has become possible to embed the data content directly into the light (without requiring a look-up via an RF network). E.g. this may be used to provide location dependent content or even to provide an alternative means of accessing a network such as the internet, as an alternative to access an RF WLAN. Li-Fi is an attractive communications technology that can either complement existing wireless radio technologies like WiFi, Bluetooth, or be offered in environments where these traditional radio technologies cannot be offered. In particular, Li-Fi in indoor environments has attracted applications like indoor positioning, networked lighting and data access. In such systems, the lighting infrastructure may be used to provide both data communications and illumination.

Li-Fi (or VLC) is often used to embed a signal in the light emitted by an illumination source such as an everyday luminaire, e.g. room lighting or outdoor lighting, thus allowing the illumination from the luminaires to double as a carrier of information. The light thus comprises both a visible illumination contribution for illuminating a target environment such as room (typically the primary purpose of the light), and an embedded signal for providing information into the environment (typically considered a secondary function of the light). In such cases, the modulation is typically performed at a high enough frequency so as to be beyond human perception, or at least such that any visible temporal light artefacts (e.g. flicker and/or strobe artefacts) are weak enough not to be noticeable or at least to be tolerable to humans. Thus the embedded signal does not affect the primary illumination function, i.e. so the user only perceives the overall illumination and not the effect of the data being modulated into that illumination.

SUMMARY

An issue with light-based communications is that they are susceptible to interference between different transmitting light sources. For instance, Li-Fi (Light-Fidelity), also known as VLC (Visible Light Communication), is an emerging technology for wireless communication. It typically converts a wired network into a wireless Li-Fi data link. The transmitter (i.e. a Li-Fi host) which may be connected to a network (e.g. the internet) would normally be mounted in the ceiling and the receiving device would be a USB dongle connected to a user device, e.g. a laptop or PC. Unlike radio frequency modulation that contains carrier frequency and a bandwidth for data modulation, Li-Fi may use the full bandwidth for data modulation and therefore has no carrier. As a result, signals from different (e.g. neighbouring) Li-Fi devices can cause interference with each other when received at the receiving device. For example, since the modulation only has a single channel, interference may occur when two different signals at almost equal power are received by the receiving device.

According to a first aspect disclosed herein, there is provided a system comprising: a plurality of first devices, each respective first device configured to transmit a low-frequency, LF, light signal comprising an identifier of the respective first device, and to transmit and/or receive a high-frequency, HF, light signal comprising data content; and a second device configured to receive a respective LF light signal from each of the first devices, and to transmit and/or receive a HF light signal from at least one of the first devices, wherein the second device has an adaptable receiving and/or transmitting direction for respectively receiving and/or transmitting the HF light signal, and wherein the second device comprises a controller configured to: based on the respective identifiers encoded in the respective LF light signals, determine a position of the second device relative to each of the first devices, and select one of the first devices; and based on said determination, adapt the receiving and/or transmitting direction of at least the HF light signal of the second device toward the selected first device.

That is, the receiving and/or transmitting direction of the second device may be directed toward the selected first device.

When an area is equipped with multiple first devices (e.g. LED or IR-LED luminaires) which are transmitting data content, there is a chance that the coverage of each individual first device overlaps with other first devices, thereby causing interference. The second device receives and extracts identifiers of the first devices and uses those identifiers to determine its position with respect to the first devices. Once the position of the second device relative to the first devices is known, the second device (which may include a high speed photodiode) can be automatically directed (e.g. tilted to an optimal direction) towards the optimal first device. This may, for example, maximize the signal-to-noise ratio of the high-frequency light signals.

In embodiments, the second device may be configured to receive the LF light signal using a receiver having a wide receiving angle. In contrast, the second device may be configured to receive the HF light signal using a receiver having a narrow receiving angle.

Preferably, the low-frequency signal is a more narrow bandwidth signal than the high-frequency data signal. The low-frequency signal can be used for directing the high-frequency data signal towards the receiver; there by improving the channel characteristics for the high-frequency data signal. As the low-frequency signal is used for directing and possibly also for signalling it can be more narrow-band. This in turn leaves more bandwidth for the wider bandwidth data signal, which as a result of the directing may allowing for a higher payload throughput.

When the second device is stationary, the directing process is easier. The second device is configured to receive the LF light signal using a receiver having a wide receiving angle, in this manner the receiver may select the optimal first device. The second HF light signal in turn can be received using a, relatively, narrower receiving angle; thus being more selective and reducing interferences from other first devices proximate to the optimal first device.

Optionally the second device may use distinct narrower beam-widths, or alternatively may vary the narrow beam-width, based on a metric quantifying device motion. This metric may be derived, from sensor input from an accelerometer or a gyroscope. The point being that if the device is stationary a narrower beam-width may be used, to further reduce interference without the risk of losing the link.

Preferably the low-frequency signal that is used for directing may also be used for signalling. As the point being that it is more likely that the second devices can receive such signalling information as the second device is configured to receive the LF light signal using a wide receiving angle (as compared to the HF data signal). When the LF light signal is also used for signalling purposes it may require more bandwidth than when it is used solely for facilitating directing. When used for signalling the bandwidth could be low, e.g. below 1 Mbit/s.

Referring to the first aspect, when positioning is determined using the received identifiers decoded from the low-frequency light signals, (e.g. using coded light indoor positioning), the second device may access the Li-Fi network via the high-frequency signals. When the second device is placed in an area where it receives identifiers from multiple first devices (e.g. multiple Li-Fi hosts), the second device can adapted such that interference is avoided and a single preferred first device is selected. For example, the second device may be automatically pivoted and tilted in the direction of the selected first device. Unlike radio technologies such as Wi-Fi, high frequency light signals such as Li-Fi can be constrained to a very accurate area. This allows the Li-Fi connection to be enabled for only a specific area or areas of an environment.

The first and second device may be each be configured to transmit and receive high-frequency light signals. This enables a two-way Li-Fi communication link between the first and second devices. Both of the transmitting and receiving directions of the second device may be automatically directed towards the selected first device, thus enabling both legs of the two-way Li-Fi link to be improved.

In embodiments, the controller may be configured to perform said selection by: selecting the first device that is nearest to the second device; and/or selecting the first device that is transmitting the respective LF light signal having the greatest received signal strength and/or the greatest signal-to-noise ratio.

In embodiments, each first device may be configured to transmit the LF light signal as a visible light signal or as an infrared light signal, and/or to transmit the HF light signal as a visible light signal or as an infrared light signal. Alternatively, one or both of the light signals may be an ultraviolet light signal.

In embodiments, the LF and HF light signals may be the same medium (e.g. both as visible light signals, or both as infrared light signals). In alternative embodiments, the LF and HF light signals may be different mediums (e.g. the LF signal may be an infrared light signal and the HF may be a visible light signal, or vice versa).

In embodiments, each first device may be configured to transmit the LF light signal as a wide beam signal, i.e. with a wide beam angle. In contrast, each first device may be configured to transmit the HF light signal as a narrow beam signal, i.e. with a narrow beam angle. That is, the HF light signal may have a substantially narrower beam angle than the LF light signal.

In embodiments, each first device may have two distinct transmitters, one configured to transmit the LF light signal and one configured to transmit the HF light signal. Alternatively, each first device may have a single transmitter configured to transmit both of the light signals. For example, the single transmitter may be configured to transmit a single light signal having LF modulation for the identifier and HF modulation for the data content.

In embodiments, the second device may have two distinct receivers, one configured to receive the LF light signal and one configured to receive the HF light signal. Alternatively, the second device may have a single receiver configured to receive both the LF and HF signals.

In some embodiments, the LF signal receiver may be mounted on the HF signal receiver of the second device.

In embodiments, at least one of: at least part of the second device may be configured to move in space, and wherein the controller may be configured to adapt the receiving and/or transmitting direction of the second device by causing said at least part of the second device to move in a direction toward the selected first device;

the second device (106) comprises an array of HF light signal receivers, each having a different direction for receiving HF light signals, and wherein the controller (308) is configured to adapt the receiving direction of the second device (106) by enabling a subset of the array of HF light signal receivers; the second device may comprise an array of photodiodes, each photodiode comprising a different lens, and wherein the controller may be configured to adapt the receiving direction of the second device by enabling only a subset of the array of photodiodes to receive HF light signals; and/or the second device may comprise an array of HF light signal transmitters each having a different direction for transmitting a HF signal, and wherein the controller may be configured to adapt the transmitting direction of the second device by enabling only a subset of the transmitters.

In embodiments, the second device may be configured to move by pivoting and/or tilting. The second device may move as a whole. Alternatively, only the receiver that is configured to receive the light signal(s) is configured to move, i.e. the HF light signal receiver may be configured to move relative to the second device.

In embodiments, the photodiode lenses may be flat (e.g. Fresnel) lenses. This is advantageous since flat lenses have a reduced height compared to normal lenses.

In embodiments, the second device may be configured to be connectable with a user device, and wherein the controller may be configured to: (i) decode data content from a HF light communication signal received from the selected first device, and relay the decoded data content to the user device via a connection between the second device and the user device; and/or (ii) code data content receiving from the user device via the connection, and relay the coded data to the selected first device as a HF light communication signal.

For example, the second device may be a dongle, preferably connected to the user device via a wired connection. However, it is not excluded that the connection may be a wireless connection (e.g. Bluetooth).

In embodiments, the second device may comprise a visual indicator, and wherein the controller may be configured to control the visual indicator to visually indicate, based on said determination, a direction in which to direct the receiving and/or transmitting direction toward the selected first device.

Using the low frequency data (i.e. the identifiers), an end user of the second device can be guided to the location where he or she has access to the Li-Fi network connection (e.g. a location based service). This control point ensures that a user has to occupy a specific area within a specific space to receive the data via the HF light signals, thus improving security of the network. This is not possible with Wi-Fi.

For example, the visual indicator may comprise a series of LEDs. Manually directing the receiving direction toward the selected first device may improve the signal-to-noise ratio of the HF light signal transmitted by the selected first device and/or reduce the interference cause by light signals transmitted by non-selected first devices.

In embodiments, each respective first device may comprise a first transmitter configured to transmit the LF light signal, and a second transmitter to transmit the HF light signal, and wherein the first and second transmitters are co-located.

Alternatively, the first and second transmitters may not be co-located, i.e. they may be located at different positions in the environment. In this case, additional information is made available to the controller for the controller to determine the position of each second transmitter in relation to the first transmitters. The positions of each first and second transmitter may be stored in memory accessible by the controller.

In embodiments, each first device may be configured to receive a light signal from the second device, wherein the second device may be configured to transmit the light signal, and wherein the light signal comprises at least one of: a HF light signal comprising data content; and/or a LF light signal comprising a wake-up signal, and wherein in response to receiving the wake-up signal, each of the first devices is configured to transmit the HF light signal.

In embodiments, the second device may be configured to transmit the LF light signal as a wide beam signal, i.e. with a wide beam angle. In contrast, the second device may be configured to transmit the HF light signal as a narrow beam signal, i.e. with a narrow beam angle. That is, the HF light signal may have a substantially narrower beam angle than the LF light signal.

In embodiments, the second device may have two distinct transmitters, one configured to transmit the LF light signal and one configured to transmit the HF light signal. Alternatively, the second device may have a single transmitter configured to transmit both light signals. For example, the single transmitter may be configured to transmit a single light signal having LF modulation for the wake-up signal and HF modulation for the data content.

In embodiments, the first device may have two distinct receivers, one configured to receive the LF light signal and one configured to receive the HF light signal. Alternatively, the first device may have a single receiver configured to receive both the LF and HF signals.

In embodiments, the first device may be configured to receive the LF light signal using a receiver having a wide receiving angle. In contrast, the first device may be configured to receive the HF light signal using a receiver having a narrow receiving angle.

In some embodiments, each of the first devices are configured to determine that the LF light signal comprising the wake-up signal has not been received from the second device within a predetermined time window, and in response, terminate transmission of the HF light signal. This is advantageous as it prevents unnecessary power consumption since those first devices that are not in the transmitting direction of the second device can be at least partially switched off.

In embodiments, the controller may be configured to: reduce the receiving opening angle of the second device to reduce interference of the HF light signal transmitted by the selected device from HF light signals transmitted by non-selected devices; and/or reduce the transmitting opening angle of the second device in order reduce interference at the non-selected first devices by the HF light signal transmitted by the second device.

In embodiments, the controller may be configured to: detect that the second device has changed position in the environment; determine an updated position of the second device relative to each of the first devices and select an updated first device; and based on said determination of the updated position, adapt the receiving and/or transmitting direction of the second device toward the updated first device.

In embodiments, the controller may be configured to perform said detection by: determining the updated position based on the respective identifiers encoded in the respective LF light signals received from each of the first devices; and/or receiving positional information from one or more accelerometers housed in the second device.

In embodiments, each first device may be a luminaire configured to illuminate at least part of an environment with visible illumination. The visible illumination may comprise the LF and/or HF light signals.

According to a second aspect disclosed herein, there is provided a receiving device comprising: a transceiver configured to receive a respective low-frequency, LF, light signal from a plurality of transmitting devices, wherein the LF light signal received from each transmitting device comprises a respective identifier of the transmitting device, and to receive and/or transmit a high-frequency, HF, light signal comprising data content, wherein the receiving device has an adaptable receiving and/or transmitting direction for respectively receiving and/or transmitting the HF light signal; and a controller configured to: based on the respective identifiers encoded in the respective LF light signals, determine a position of the receiving device relative to each of the transmitting devices and select one of the transmitting devices; and based on said determination, adapt the receiving and/or transmitting direction of the receiving device toward the selected transmitting device.

According to a third aspect disclosed herein, there is provided a method comprising: receiving, from each of a plurality of first devices, a respective low-frequency, LF, light signal comprising an identifier of a respective first device; based on the respective identifiers encoded in the respective LF light signals, determining a position of a second device relative to each of the first devices, wherein the second device comprises an adaptable receiving and/or transmitting direction for respectively receiving and/or transmitting a high-frequency, HF, light signal comprising data content, and selecting one of the first devices; and based on said determination, adapting the receiving direction and/or transmitting direction of the receiving device toward the selected transmitting device.

In embodiments, the method comprises: transmitting, by each of the first devices, the respective LF light signals; and transmitting, by at least the selected first device, the HF light signal.

According to a fourth aspect disclosed herein, there is provided a computer program product comprising instructions which, when the program is executed by a second device according to any embodiments disclosed herein, cause the second device to carry out the method any of the embodiments disclosed herein.

According to a fifth aspect disclosed herein, there is provided a transmitting device comprising a transmitter configured to transmit a low-frequency, LF, light signal comprising an identifier of the transmitting device, and to transmit a high-frequency, HF, light signal comprising data content.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
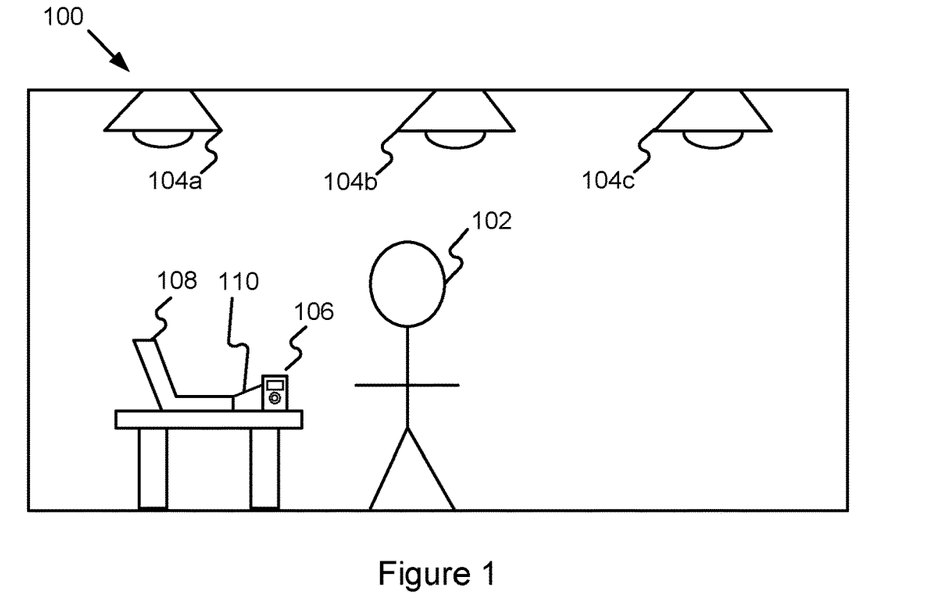
FIG. 1 shows schematically an example environment comprising a system of first and second devices according to embodiments of the invention.

FIG. 1 illustrates an example environment 100 in which embodiments disclosed herein may be employed. The environment 100 is a space which may be occupied by one or more users 102. The environment 100 may take the form of an indoor space such as one or more rooms of a home, office or other building; an outdoor space such as a garden or park; a partially covered space such as a gazebo; or a combination of such spaces such as a campus or stadium or other public place that has both indoor and outdoor spaces.

The environment 100 is equipped with a plurality of first devices 104 installed or otherwise disposed at different locations throughout the environment 100. Hereinafter, a first device may also be referred to as a transmitting device. In the example of FIG. 1, three first devices 104a, 104b, 104c are shown, but it will be appreciated that any number of first devices 104 may be present. The first devices 104 will be described in detail with reference to FIG. 3.

As shown in this example, each first device 104 may be a luminaire. A luminaire 104 may refer to any kind of illumination device for illuminating an environment or part of the environment occupied by a user 102, whether providing, for example, ambient lighting or specific task lighting. Each of the luminaires 104 may take any of a variety of possible forms, such as a ceiling or wall mounted luminaire, a free-standing floor or table luminaire, or a less traditional form such as a luminaire 104 embedded in a surface or an item of furniture. The different luminaires 104 in the environment 100 need not take the same form as one another. Whatever form it takes, each luminaire 104 comprises at least one lamp (illumination element) and any associated housing, socket and/or support. Examples of suitable lamps include LED-based lamps, or traditional filament bulbs or gas discharge lamps.

The environment 100 is also equipped with one or more second devices 106. In the example of FIG. 1 a single second device 106 is shown. Hereinafter, a second device may also be referred to as a receiving device. The receiving device 106 will be described in detail with reference to FIGS. 2 and 3.

The environment 100 may also be equipped with one or more user devices 108. The user device 108 may be, for example, a mobile device including, for example, a mobile or cell phone (including a so-called "smart phone"), a personal digital assistant, a pager, a tablet or a laptop computer, as well as a wearable communication device such as a so-called "smart watch". The user device 108 may be connected to the second device 106 via a connection 110. The connection may be a physical connection (e.g. a wired connection) or a wireless connection (e.g. a Bluetooth connection). In some examples, the second device 106 may be a dongle that is plugged into a cooperating port of the user device 108, e.g. a USB port.

Figure 3:
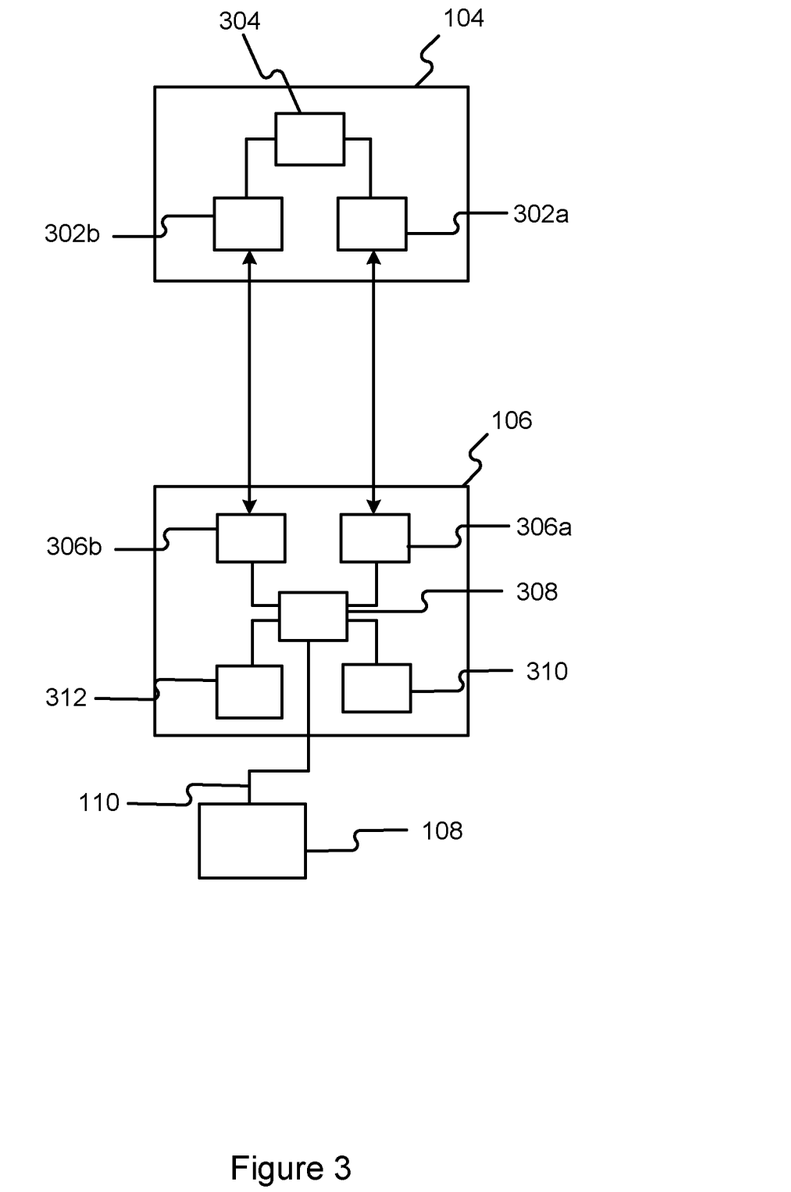
FIG. 3 shows schematically an example block diagram of a system according to embodiments of the invention.

FIG. 3 illustrates an example block diagram of a first device 104 interacting with a second device 106 according to some embodiments. The first device comprises a transmitter configured to transmit infrared light signals and/or visible light signals. As shown in this example, the first device comprises two separate transmitters 302a, 302b, a first receiver 302a (hereinafter referred to as a low-frequency transmitter) configured to transmit low-frequency light signals and a second transmitter 302b (hereinafter referred to as a high-frequency transmitter) configured to transmit high-frequency light signals. Each transmitter may comprise one or more emitters, e.g. light emitting diodes (LEDs), infrared LEDs, etc. In some examples, each of the transmitters 302a, 302b are configured to transmit the same light medium. For example, both transmitters 302a, 302b may be configured to transmit either infrared light or visible light. In other examples, each of the transmitters 302a, 302b may be configured to transmit different light mediums. For example, the low-frequency transmitter 302a may be configured to transmit infrared light whilst the high-frequency transmitter 302b may be configured to transmit visible light, and vice versa. In other examples, the first device comprises a single transmitter configured to transmit both a high-frequency light signal and a low-frequency light signal. The high and low-frequency light signals may be transmitted one after the other. For example, a low-frequency light signal may be transmitted for a first time period, followed by a high-frequency light signal, followed by the low-frequency signal, and so on. Alternatively, the high and low frequency light signals may be sent in parallel (e.g. the second device may have a filter for separating the high and low frequency signals), e.g. using orthogonal frequency-division multiplexing (OFDM). As an option, part of the OFDM frequency set (e.g. frequencies close to DC) can be selected to carry a separate control signal instead of a separate uncorrelated LF signal. An advantage of this option is that no additional filtering is needed to separate the low-frequency light signal from the high-frequency light signal. Furthermore, potential interference of low-frequency harmonics into the OFDM can be avoided.

The first device is configured to transmit a low-frequency light signal, e.g. using the low-frequency transmitter 302a, that comprises an identifier of that first device. In other words, an identifier of the first device is encoded in the low-frequency light signal. Each different first device is configured to transmit a different identifier. That is, each first device is configured to transmit an identifier that is unique to that first device in the system. The first device is also configured to transmit a high-frequency light signal, e.g. using the high-frequency transmitter 302b, that comprises data content, e.g. location dependent content. In other words, data content is encoded in the high-frequency light signal. Each first device may be configured to transmit the same data content or different data content.

In some embodiments, the first device comprises a receiver configured to receive a low-frequency light signal and to receive a high-frequency light signal. The receiver may be configured to receive infrared light signals and/or visible light signals. As shown in the example of FIG. 3, the transmitters described above may be transceivers. That is, the first device may comprise two transceivers 302a, 302b. The first transceiver 302a (hereinafter referred to as a low-frequency transceiver) may be configured to receive low-frequency light signals. The second transceiver 302b (hereinafter referred to as a high-frequency transceiver) may be configured to receive high-frequency light signals. In some examples, each of the transceivers 302a, 302b may be configured to receive the same light medium. In other examples, each of the transceivers 302a, 302b may be configured to receive different light mediums. The transceivers 302a, 302b may comprise, for example, photodiodes, infrared sensors, etc.

The first device may comprise a controller 304 configured to control the transmitters 302a, 302b. The controller may be operatively coupled to the components of the first device (i.e. the transmitters and receivers). For example, the controller may control the transmission (e.g. the duration, frequency and content) of the low and high frequency light signals. When the first device 104 comprises receivers, the controller 304 may be configured to decode data encoded in the received light signals. In embodiments, the controller 304 of the first device is implemented in the form of software stored on a memory of the first device and arranged for execution on a processing apparatus of the first device (the memory on which the software is stored comprising one or more memory units employing one or more storage media, e.g. EEPROM or a magnetic drive, and the processing apparatus on which the software is run comprising one or more processing units). Alternatively it is not excluded that some or all of the controller 304 could be implemented in dedicated hardware circuitry, or configurable or reconfigurable hardware circuitry such as a PGA or FPGA.

In embodiments where the first device 104 is a luminaire, the luminaire may comprise a light source (i.e. one of the transmitters) and a driver (not shown) connected to the light source. The controller 304 may be coupled to an input of the driver, for controlling the light source to be driven via the driver. Particularly, the controller may be configured to control the light source, via the diver, to modulate the illumination it emits in order to embed data, e.g. a cyclically repeated coded light message. Any suitable known modulation technique may be used to do this.

The second device 106 comprises a receiver 306 configured to receive a low-frequency light signal and to receive a high-frequency light signal. The receiver 306 may be configured to receive infrared light signals and/or visible light signals. As shown in this example, the second device 106 comprises two separate receivers 306a, 306b, a first receiver 306a (hereinafter referred to as a low-frequency receiver) configured to receive low-frequency light signals and a second receiver 306b (hereinafter referred to as a high-frequency receiver) configured to receive high-frequency light signals. In some examples, each of the receivers 306a, 306b may be configured to receive the same light medium. For example, both receivers 306a, 306b may be configured to receive either infrared light or visible light. In other examples, each of the receivers 306a, 306b may be configured to receive different light mediums. For example, the low-frequency receiver 306a may be configured to receive infrared light whilst the high-frequency receiver 306b may be configured to receive visible light, and vice versa. The receivers 306a, 306b may comprise, for example, photodiodes, infrared sensors, etc.

Based on the modulations in the received light signals, the information in the coded component of the light can be detected using any suitable light sensor. This can be either a dedicated photocell (point detector), or a camera comprising an array of photocells (pixels) and a lens for forming an image on the array. E.g. the camera may be a general purpose camera. For example, the second device 106 may comprise a camera (or any other suitable light sensor) and a decoder (not shown) coupled to an input from the camera in order to receive images captured by the camera. The decoder is configured to extract the information transmitted in the visible light, e.g. from the one or more first devices 104. In embodiments the decoder may be incorporated into the same unit. However, the decoder need not necessarily be implemented in the same physical unit as the second device 106.

In some embodiments, the second device 106 may comprise a transmitter configured to transmit infrared light signals and/or visible light signals. As shown in this example, the second device comprises two separate transmitters 306a, 306b, a first receiver 306a (hereinafter referred to as a low-frequency transmitter) configured to transmit low-frequency light signals and a second transmitter 306b (hereinafter referred to as a high-frequency transmitter) configured to transmit high-frequency light signals. That is, the second device may comprise transceivers 306a, 306b. Each transmitter may comprise one or more emitters, e.g. light emitting diodes (LEDs), infrared LEDs, etc. In some examples, each of the transmitters 306a, 306b are configured to transmit the same light medium, i.e. the same type of light. For example, both transmitters 306a, 306b may transmit visible light. In other examples, each of the transmitters 306a, 306b may be configured to transmit different light mediums. In other examples, the second device 106 comprises a single transmitter configured to transmit both a high-frequency light signal and a low-frequency light signal.

The controller 308 may be operatively coupled to the components of the second device (i.e. the transmitters and receivers). The controller 308 may be implemented in the form of software stored on a memory of the second device 106 and arranged for execution on a processing apparatus of the second device 106 (the memory on which the software is stored comprising one or more memory units employing one or more storage media, e.g. EEPROM or a magnetic drive, and the processing apparatus on which the software is run comprising one or more processing units). Alternatively it is not excluded that some or all of the controller 308 could be implemented in dedicated hardware circuitry, or configurable or reconfigurable hardware circuitry such as a PGA or FPGA. For example, the controller 308 may be configured to decode data encoded in the received light signals. The controller may also control the transmission (e.g. the duration, frequency and content) of the low and high frequency light signals.

Figure 4A:
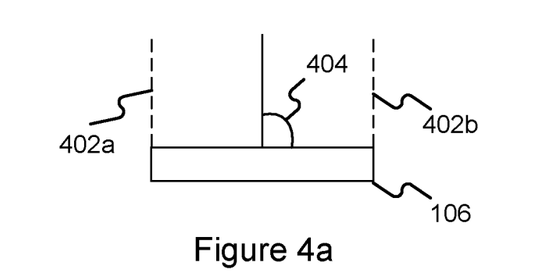
FIG. 4a-d show schematically examples of an adaptable receiving direction of a second device.
Figure 4B:
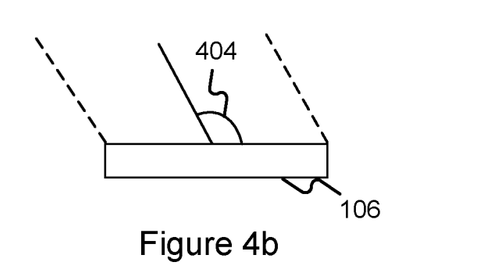

In embodiments, the second device 106 may have an adaptable receiving direction for receiving high-frequency light signals. FIGS. 4a and 4b illustrates how the receiving direction may be adapted. The receiving direction of the second device affects the direction from which high-frequency light-signals may be received. The lines 402a, 402b delimit the extent of the field of view of the receiving device. In FIG. 4a, the receiving direction is substantially perpendicular to the receiving device 106. The receiving device may have a receiving angle 404 measured from a plane of the receiving device (or at least a plane of the high-frequency receiver). In the example of FIG. 4a, the receiving angle is 90 degrees. In FIG. 4b, the receiving direction has been adapted and therefore the field of view (delimited by the dashed lines has changed) of the receiving device has changed. In this example, the receiving angle 404 has increased. Similarly, the second device may have an adaptable transmitting direction (not shown) for transmitting high-frequency light signals. The receiving device (or the high-frequency transmitter of the receiving device) may have a transmitting angle that may be changed to affect the direction in which high-frequency light beams are transmitted.

Figure 4C:
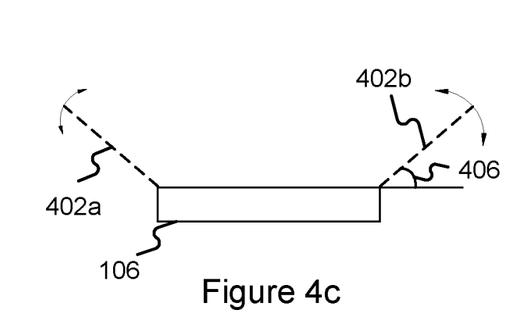
Figure 4D:
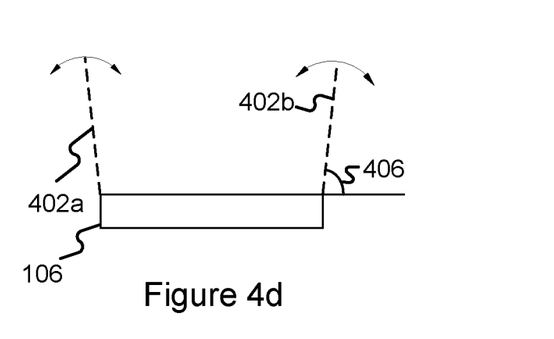

In some embodiments, the extent of the direction from which signals may be received may be adapted. That is, field of view of the receiving device may be increased or decreased. For example, the field of view of the receiving device in FIG. 4c is larger than the field of view of the receiving device in FIG. 4d. The receiving device may have a (receiving) opening angle 406 measured from a plane of the receiving device (or the high-frequency receiver). As the opening angle of the receiving device increases, the field of view decreases. In some examples, the receiving direction and the opening angle may be changed independently. In other examples, both the receiving direction and the opening may be changed. Similarly, a (transmitting) opening angle of the receiving device (or of the high-frequency transmitter of the receiving device) may be adapted.

In embodiments, the second device 106 may comprise a mechanism 310, controlled by the controller 308, configured to move at least part of the second device 106. For example, the mechanism 310 may be configured to pivot and/or tilt at least part of the second device 106. The mechanism may be configured to move (e.g. pivot and/or tilt) one or both of the receivers 306a, 306b and/or one or both of the transmitters, e.g. relative to the second device 106. Furthermore, as shown in FIG. 3, the second device 106 may comprise a connector 110 for connecting with a user device 108, e.g. a one-to-one connection such as a serial cable or USB cable.

Figure 2:
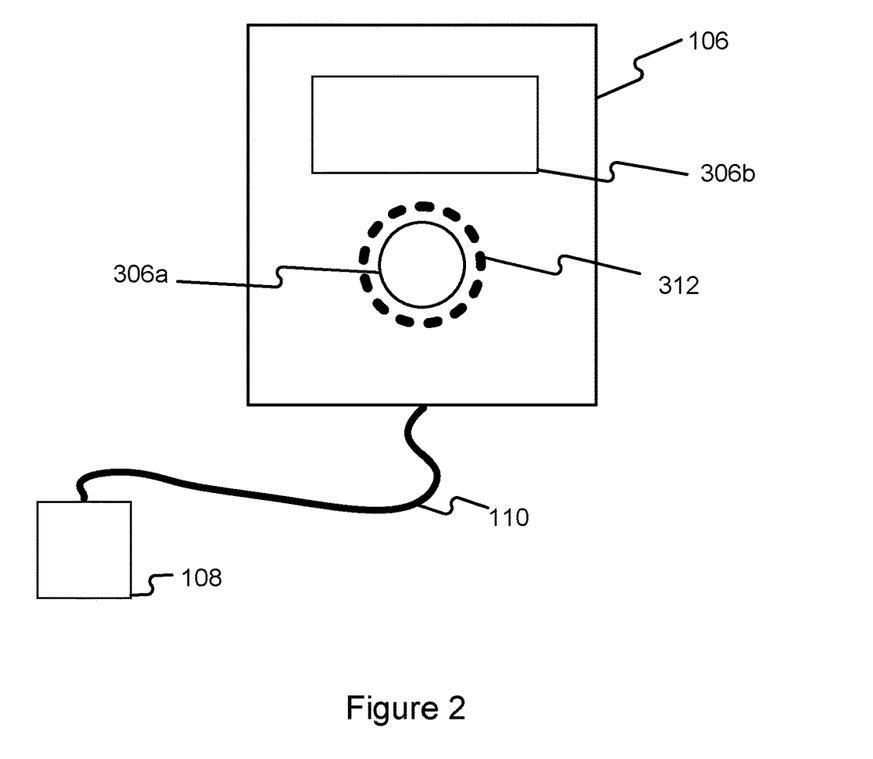
FIG. 2 shows schematically an example of a second device.

FIG. 2 illustrates an example implementation of the second device 106. As shown, both the low and high frequency receivers 306a, 306b are positioned on the same face of the second device 106. In this example, the second device 106 further comprises a visual indicator 312. The function of the visual indicator 312 will be described below. The visual indicator 312 may comprise one or more LEDs. For example, as shown, the visual indicator 312 may comprise a circle of LEDs. The visual indicator 312 is operatively coupled to and controlled by the controller 308.

Embodiments of the invention will now be described by way of example only with reference to FIG. 5

Figure 5:
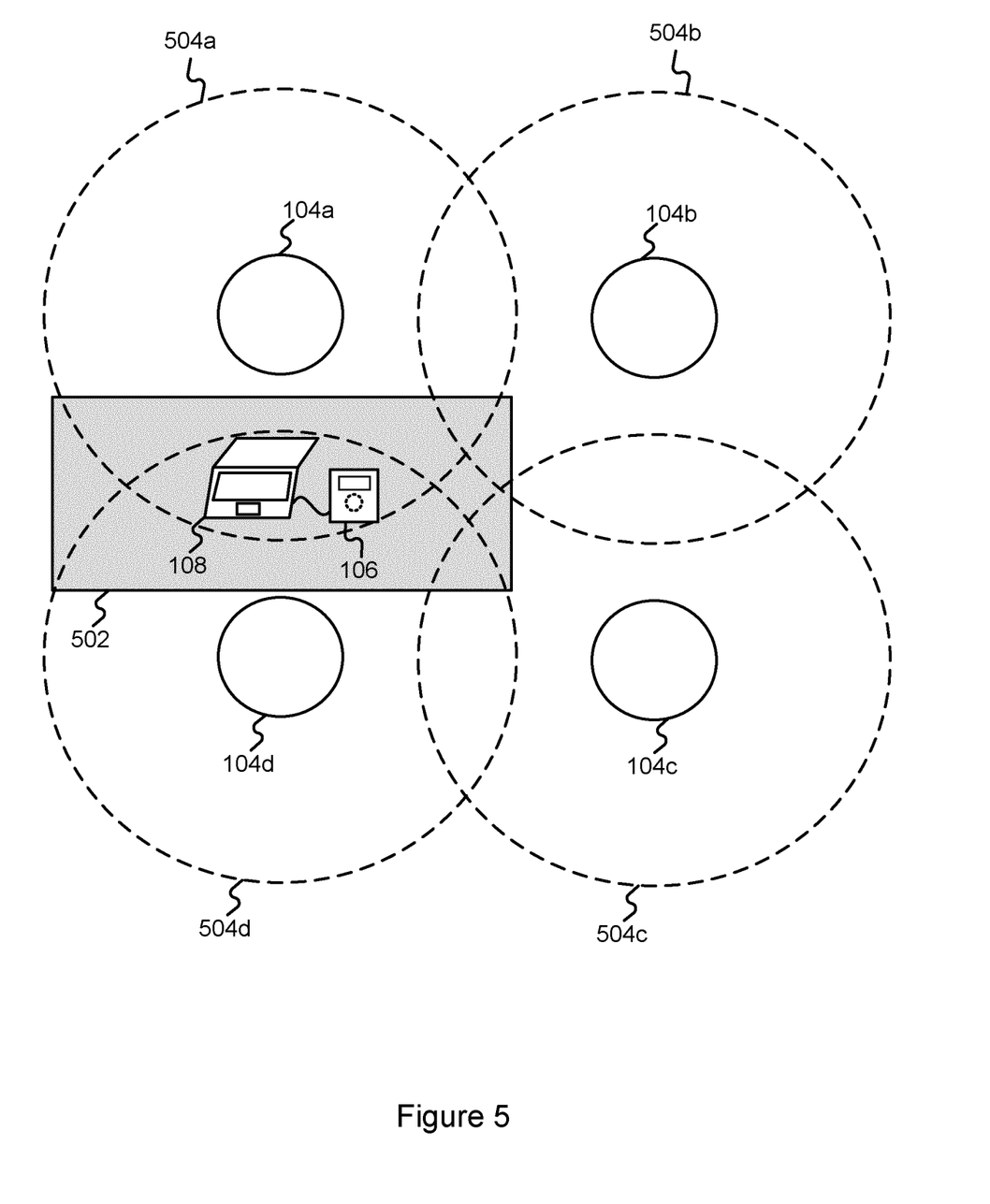
FIG. 5 shows schematically an example of a second device receiving light signals from a plurality of first devices.

In the example of FIG. 5 there are four first devices (transmitting devices) 104a-d and a single second device (receiving device) 106. Each transmitting device 104 transmits a respective low-frequency light signal comprises a respective identifier of that transmitting device. The low-frequency light signals may be transmitted as wide beam signals, i.e. with a wide beam angle. The receiving device 106 may use a receiver having a wide receiving angle for receiving the wide beam low-frequency signal, and a receiver having a narrow receiving angle for receiving the narrow beam, high-frequency signal. In some embodiments, each transmitting device 104 also transmits a respective high-frequency light signal that comprises data content. The high-frequency light signals may be transmitted as narrow beam signals, i.e. with a narrow beam angle. The beam angle of the high and/or low frequency light signals may be fixed or adaptable. For example, the beam angles may be predetermined based on the configuration of the LEDs of the low and high-frequency transmitters. The beam angle of the transmitters affects the coverage area of said transmitters, i.e. the area within the environment 100 that is directly impinged by the light signals (not including areas indirectly impinged by, say, reflections of the light signals off surfaces within the environment 100).

The receiving device 106 receives some or all of the respective low-frequency light signals. The receiving device 106 may also receive some or all of the respective high-frequency light signals. This may cause undesirable interference of the high-frequency light signals at the receiving device.

The controller 308 of the receiving device 106 (hereinafter referred to as "the controller" unless the context requires otherwise, e.g. when describing actions of the controller 304 of the transmitting device 104) uses the respective identifiers of the transmitting devices that it receives to determine a position of the receiving device 106 relative to the transmitting devices. Determining a position of a device based on coded identifiers is known in the art, e.g. WO2015/144553 A1, hereby incorporated by reference shows an indoor-positioning system that uses a rolling shutter camera.

For selection of a first transmitting/receiving device out of a plurality of devices, it is not strictly necessary to perform absolute positioning, i.e. the determination of the actual latitude/longitude. Absolute positioning might be implemented when the identifier of each transmitting/receiving device of the plurality of devices has a known position; e.g. determined during commissioning of the system. At that point it may be possible to map the identifiers to particular map locations in the light plan; in such a situation the actual location of the mobile receiver/transmitting device may be determined using tri-angulation/tri-lateration, multi-angulation/multi-lateration. Selection may then be done based on absolute position/location.

However, for selection of one of the plurality of first transmitting/receiving devices it is generally sufficient to know the relative position/location. Determining of the relative location merely requires that the identifiers of transmitting/receiving devices in line of sight are locally unique, after which one of the aforementioned techniques known to those skilled in the art can be used (given known transmit strengths of the transmitters).

Once the relative position of the transmitting device 104 is known, the controller 308 selects one of the transmitting devices. For example, the controller 308 may select the transmitting device 104 that is nearest to the receiving device. Alternatively, the controller 308 may select the transmitting device 104 that is transmitting a low-frequency light signal having the greatest received signal strength when received by the receiving device. As another alternative, the controller 308 may select the transmitting device 104 that is transmitting a low-frequency light signal having the greatest signal-to-noise ratio when received at the receiving device. In some examples, the selection may be based on a combination of these factors. For example, if two transmitting devices are equally nearest to the receiving device 106 (or at least determined to be equally nearest to the receiving device 106 based on the accuracy of the determined position), the controller 308 may select the transmitting device 104 that is then transmitting a signal with the greatest received signal strength. Other combinations are possible. The selection is based on at least the received identifiers, and may also be based on the determined position of the receiving device.

In some embodiments, based on the determined position of the receiving device, the controller 308 adapts the receiving direction 402 of the receiving device 106 to direct the receiving direction 402 toward the selected transmitting device, i.e. in the direction of the transmitting device. In some examples, this may result in the receiving device 106 receiving high-frequency light signals from only the selected transmitting device. In some examples, this may result in the receiving device 106 receiving higher quality high-frequency light signals from the selected transmitting device, e.g. the receiving signal strength of the high-frequency light signals received from the selected transmitting device 104a may be increased.

For example, as shown in FIG. 5, the receiving device 106 is placed on a desk 502 and each transmitting device (e.g. each luminaire) 104a-d transmits a respective high-frequency signal that has a respective coverage area 504a-d. The receiving device 106 receives a respective high-frequency light signal from two transmitting devices 104a, 104d since it is positioned in the overlap of the coverage areas 504a, 504d of those transmitting devices 104a, 104d.

By adapting the receiving direction 402 of the receiving device 106 toward one of the transmitting devices, say transmitting device 104a, the receiving device 106 may receive a higher quality signal from transmitting device 104a.

After receiving the high-frequency light signals from the selected transmitting device, the controller 308 may decode the data content encoded in those light signals and relay the decoded data content to the user device, e.g. using the wired connection between the receiving device 106 and the user device 108.

In additional or alternative embodiments, based on the determined position of the receiving device, the controller 308 adapts the transmitting direction of the receiving device to direct the transmitting direction toward the selected transmitting device, i.e. in the direction of the transmitting device. In some examples, this may result in the transmitting device 104 receiving high-frequency light signals from the receiving device. In some examples, this may result in the transmitting device 104 receiving higher quality high-frequency light signals from the receiving device.

The receiving device 106 may receive data content from the user device, e.g. via the wired connection, and encode that data content to be transmitted to the selected transmitter via the high-frequency light signals.

In some embodiments, the receiving device 106 may be configured so that the high-frequency transmitter and/or receiver is mounted on the low-frequency receiver. That way, the adaption of the transmitting and/or receiving direction 402 of the receiving device 106 may be more accurately directed towards the selected transmitting device. Alternatively, the high-frequency transmitter and/or receiver may just be mounted on the same face of the receiving device 106 as the low-frequency receiver.

Figure 6A:
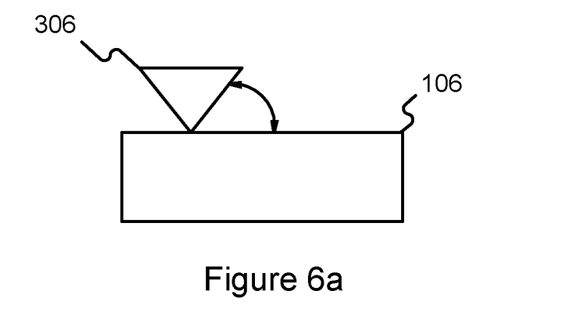
FIG. 6a-c show examples of how a receiving direction of a second device may be adapted.

The receiving and/or transmitting direction of the receiving device 106 may be adapted in one or more of several ways. As a first example, as described above, the direction(s) may be adapted by the receiving device 106 moving in space in a direction toward the selected transmitting device. This may involve the receiving device 106 moving as a whole, or only part of the receiving device 106 moving, e.g. the high-frequency receiver and/or transmitter. Furthermore, the movement may involve pivoting and/or tilting of the receiving device, e.g. a pivoting and/or tilting of the high-frequency transmitter and/or receiver. The movement may be caused by the mechanism. FIG. 6a illustrates an example of a transceiver 306 that may move relative to the receiving device 106.

Figure 6B:
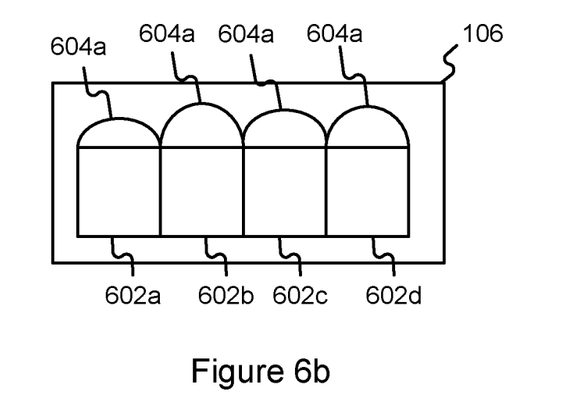

As a second example, the second device may comprise an array of photodiodes and each photodiode may comprise a different lens (e.g. different shape, size, and/or type). The different lenses result in the photodiodes receiving light signals from different directions. By enabling a subset of the array of photodiodes, high-frequency light signals from a particular direction, but not from other directions, may be received. Therefore the controller 308 may enable a subset of photodiodes that result in high-frequency signals transmitted by the selected transmitting device 104a being received. FIG. 6b illustrates an example of a receiving device 106 having an array of photodiodes 602a-d, each having a respective different lens 604a-d.

Figure 6C:
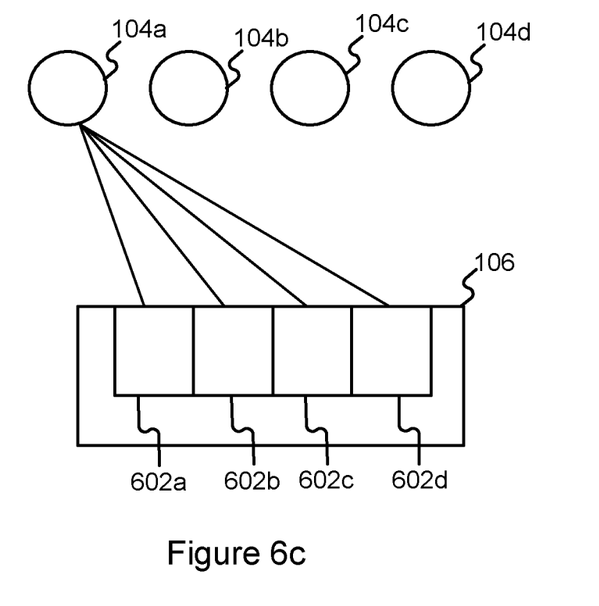

As a third example, the receiving device 106 may comprise an array of high-frequency light signal transmitters and/or receivers (or transceivers). The array of high-frequency transmitters may be covered by a lens that in such way that outgoing beams can be selected by selecting a number of active transmitters of the array. For example, each transmitter may have a different direction for transmitting high-frequency light signals. Similarly, the same lens and array principle may be applied to the receiver (e.g. the photodiode circuit). That is, each receiver may be configured to receive high-frequency light signals from a different direction, and a subset of the receivers may be enabled to control the direction from which signals are received. FIG. 6c illustrates how a particular transmitting device 104a, out of several transmitting devices 104b-d, can be targeted for signal transmission or reception using an array of transmitters or receivers respectively.

As an optional feature, the controller 308 may control the visual indicator to indicate, to a user 102, a direction in which to direct the receiving device, i.e. a direction in which to direct the receiving and/or transmitting direction of the receiving devices. By directing the receiving device 106 in the indicated direction toward the selected transmitting device, the connection between the receiving and selected transmitting device 104a may be improved. For example, if the receiving device 106 comprises a (circular) array of LEDs, the controller 308 may activate one or more of the LEDs to indicate which direction to direct the receiving device, e.g. an LED on the right hand side of a circular array of LEDs may be enabled to indicate that the receiving device 106 should be tilted in an eastward direction.

As another optional feature, the receiving device 106 may transmit a low-frequency light signal. The low-frequency light signal may be transmitted as a wide beam signal, i.e. with a wide beam angle. The low frequency signal may be composed of a carrier wave which is similar to a pilot tone. The carrier wave ensures that detection can occur at very low power signal levels similar to TV remote controllers. The LF data can also include a carrier wave such that it can easily be detected at longer distance with a larger signal coverage angle. Furthermore, each of the transmitting devices may determine that a low-frequency light signal has not been received within a predetermined time period and, if such a light signal has not been received within a predetermined time period, terminate transmission of the high-frequency light signal. This offers an additional power saving for the transmitting device 104 as the high-frequency transmitter can be powered off if the receiving device 106 is not present in the environment 100 or if the transmitting devices are not in the coverage area of the receiving device.

In some embodiments, once a transmitting device is selected, the field-of-view of the receiving device 106 may be reduced in size, i.e. it may be made narrower, by adapting the receiving opening angle. This therefore reduce the amount of high-frequency light signals received from non-selected transmitted devices, and therefore interference of the high-frequency light signals transmitted by the selected device caused by the high-frequency light signals transmitted by non-selected devices may be reduced. Similarly, the transmitted beam angle of the receiving device 106 may be reduced, by adapting the transmitting opening angle, in order reduce interference at the non-selected transmitted devices caused by the high-frequency light signals transmitted by the receiving device.

The receiving device 106 may be a portable device such that a user 102 may move the receiving device 106 within the environment 100. The receiving device 106 may be moved separately from or together with a user device 108 with which it is connected. If the receiving device 106 is moved it may be moved to a position where the selected transmitting device 104a is no longer the optimal transmitting device. For instance, the receiving and/or transmitting direction of the receiving device 106 may no longer be directed toward the selected transmitting device.

In some embodiments, the receiving device 106 is able to detect that it has changed position within the environment 100, i.e. that it has moved. For example, in the same way that the initial position of the receiving device 106 with respect to the transmitting devices was determined, the controller 308 may use the identifiers received from the light signals to determine that its position with respect to the transmitting devices has changed. Additionally or alternatively, the receiving device 106 may comprise one or more accelerometers and the controller 308 may use data received from the accelerometers to detect movement of the receiving device.

In response to determining an updated position of the receiving device 106 relative to each of the transmitting devices, the controller 308 may select a transmitting device. Depending on the receiving identifiers, the controller 308 may select the same transmitting device 104 (e.g. the receiving device 106 may not have moved substantially, or the receiving device 106 may have moved but the receiving direction 402 is still directed toward the same transmitting device) or it may select a different (i.e. updated) transmitting device. The controller 308 may then adapt the transmitting and/or receiving direction 402 of the receiving device 106 to be directed toward the updated transmitting device. As discussed above, said adapting may involve, for example, tilting and/or pivoting of the receiver(s) and/or transmitter(s) of the receiving device.

Further non-limiting examples will now be described.

Embodiments may comprise a receiving device 106 (e.g. a dongle) comprising one or more of the following elements: a pivotable and/or tiltable Li-Fi transceiver that includes photodiode(s) and IR-LEDs an IPS (Indoor Positioning System) sensor, a processing unit for detection and control of the pivot and tilt, an LED indicator for providing feedback to the user, and a flexible opening angle adaptation to optimize positioning and interference mitigation.

A position of the IPS sensor with respect to transmitting devices (e.g. luminaires) can be determined by observing the codes that are emitted by the different luminaires. Each luminaire may have its own code. Decoding such low frequency signal can be done cost effectively as the IPS signal comprises low frequency modulation (a simple 32-bit micro controller 308 is sufficient). To make a distinction between different luminaires, the sensor may require two or more sensor signals (and can contain as many as a matrix or camera pixels as input signals) to determine the position of the dongle relative to the Li-Fi host, i.e. luminaire. Based on the IPS signal, the dongle can provide feedback to the user about the best position and orientation for the LiFi dongle for optimal data-link performance. The LED indicators may also point out the direction to which the PD and IR-LED should be directed or placed towards. Tilting of the PD and IR-LED can be done manually or automatically by using the IPS sensor input data. To support the positioning facilities, the opening angle at which the dongle receives signals should preferably be wide. Once the optimal position and tilting has been established, the interference of an unwanted Li-Fi access-point (AP) in the ceiling can be mitigated by reducing the opening angle. This will also mitigate the interference of the dongle signal towards the Li-Fi AP. Another option for controlling the receiving direction 402 is to use two flat (Fresnel) lenses that are slightly moved horizontally in x-y direction. Another option is an array of photodiodes with different lenses, and by selecting a sub set of photodiodes the receiving direction 402 is influenced.

When an area is equipped with LiFi enabled LED luminaires, there is a chance that the coverage of each individual luminaire overlaps with neighbouring luminaires, thereby causing interference. For example a single dongle may be placed in a position where it has Li-Fi coverage of two luminaires which results in interference. The overlapping area of interference may not only occur in a stationary situation, but also in a dynamic environment 100 when a person moves around with the dongle in a space with multiple Li-Fi enabled luminaires. Preferably, the dongle should alter from one to the other Li-Fi host as the user 102 transitions from one position to another, using information about the position of the dongle relative to the Li-Fi hosts.

The IPS receiver, which preferably has a camera, observes the ceiling for Li-Fi enabled luminaires. Once the position of the dongle with respect to the Li-Fi host is known, the Li-Fi transceiver (which may include a high-speed photodiode and a IR LED) within the dongle is tilted automatically to the optimal direction with respect to the Li-Fi host to maximize the signal-to-noise ratio of the Li-Fi link. Next to the IPS sensor, accelerometers may also be included in the dongle to compensate and enhance IPS when the user 102 moves through a Li-Fi enabled area. For some devices, the IPS could provide feedback through LEDs such that the user 102 can reposition and tilt the Li-Fi transceiver within the dongle to optimize its position towards the Li-Fi host. The IPS sensor may be mounted on the dongle or mounted on the pivotable and tiltable part of the Li-Fi modem.

In some examples, the low-frequency signal may be modulated with a carrier wave (e.g. a carrier wave similar to an infrared remote control signal) in order to ease detection while applying significantly lower emission power levels.

Figure 7:
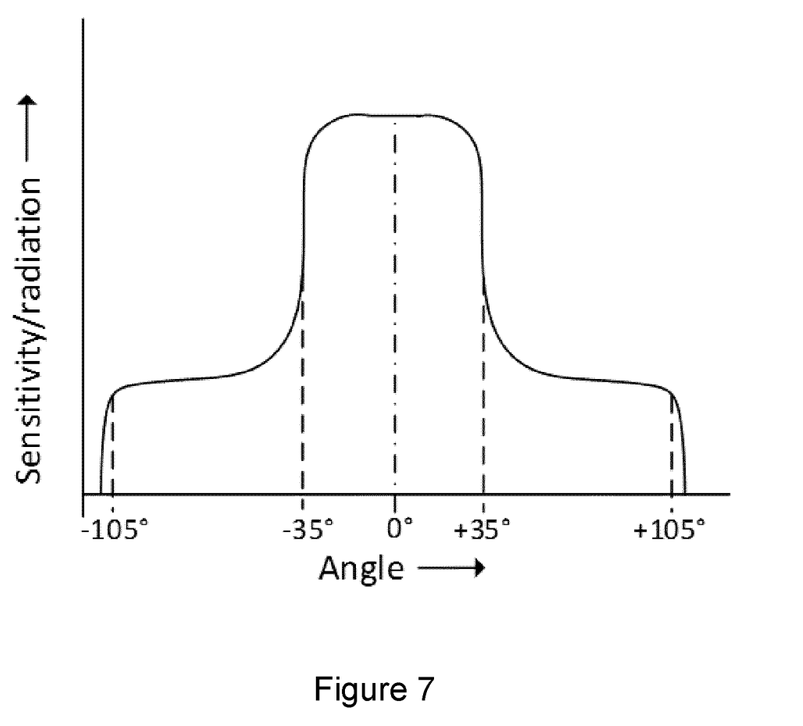
FIG. 7 shows an example an optical radiation pattern comprising both a low and high frequency signal for respectively covering a narrow and wide distribution area.

In some examples, a single transmitter may be used that emits a signal comprising both frequencies (low and high) and an optical radiation pattern to cover both distribution area's (i.e. large for detection and small for data transmission), as shown in FIG. 7. The same may be applied to the reception path: e.g. a single photodiode with a custom sensitivity pattern lens that can be applied to a single photo diode, where low and high frequency signals may be extracted by filtering the incoming signal in order to separate the low and high frequency signals from each other. For an array, this may mean that the low-frequency signal is applied to a larger number of emitters and photodiodes, while radio frequency is applied to a smaller selection of emitters and photodiodes.

An advantage of the combination of Li-Fi and IPS is that the Li-Fi connection for specific dongles can only be enabled at specific locations. Further advantages are that the user 102 or dongle is traceable, and connection is made more secure as the user 102 is forced into a specific area to have access to critical data.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
    a plurality of first devices, each respective first device configured to transmit a low-frequency, LF, light signal comprising an identifier of the respective first device, and to transmit and/or receive a high-frequency, HF, light signal comprising data content; and
    a second device configured to receive a respective LF light signal from each of the first devices, and to transmit and/or receive a HF light signal from at least one of the first devices, wherein the second device has an adaptable receiving and/or transmitting direction for respectively receiving and/or transmitting the HF light signal, and wherein the second device comprises a controller configured to:
    based on the respective identifiers encoded in the respective LF light signals, determine a position of the second device relative to each of the first devices, and select one of the first devices; and
    based on said determination, adapt the receiving and/or transmitting direction of at least the HF light signal of the second device toward the selected first device
    and wherein the second device is configured to receive the LF light signal using a receiver having a wide receiving angle, and to receive the HF light signal using a receiver having a narrow receiving angle.

2. A system according to claim 1, wherein the controller is configured to perform said selection by:
    selecting the first device that is nearest to the second device; and/or
    selecting the first device that is transmitting the respective LF light signal having the greatest received signal strength and/or the greatest signal-to-noise ratio.

3. A system according to claim 1, wherein each first device is configured to transmit the LF light signal as a visible light signal or as an infrared light signal, and/or to transmit the HF light signal as a visible light signal or as an infrared light signal.

4. A system according to claim 1, wherein at least one of:
    at least part of the second device is configured to move in space, and wherein the controller is configured to adapt the receiving and/or transmitting direction of the second device by causing said at least part of the second device to move in a direction toward the selected first device;
    the second device comprises an array of HF light signal receivers, each having a different direction for receiving HF light signals, and wherein the controller is configured to adapt the receiving direction of the second device by enabling a subset of the array of HF light signal receivers;
    the second device comprises an array of photodiodes, each photodiode comprising a different lens, and wherein the controller is configured to adapt the receiving direction of the second device by enabling only a subset of the array of photodiodes to receive HF light signals; and/or
    the second device comprises an array of HF light signal transmitters each having a different direction for transmitting a HF signal, and wherein the controller is configured to adapt the transmitting direction of the second device by enabling only a subset of transmitted HF light signals.

5. A system according to claim 1, wherein the second device is configured to be connectable with a user device, and wherein the controller is configured to:
   (i) decode data content from a HF light communication signal received from the selected first device, and relay the decoded data content to the user device via a connection between the second device and the user device; and/or
   (ii) code data content receiving from the user device via the connection, and relay the coded data to the selected first device as a HF light communication signal.

6. A system according to claim 1, wherein the second device comprises a visual indicator, and wherein the controller is configured to control the visual indicator to visually indicate, based on said determination, a direction in which to direct the receiving and/or transmitting direction toward the selected first device.

7. A system according to claim 1, wherein each respective first device comprises a first transmitter configured to transmit the LF light signal, and a second transmitter to transmit the HF light signal, and wherein the first and second transmitters are co-located.

8. A system according to claim 1, wherein each first device is configured to receive a light signal from the second device, wherein the second device is configured to transmit the light signal, and wherein the light signal comprises at least one of:
   a HF light signal comprising data content; and/or
   a LF light signal comprising a wake-up signal, and wherein in response to receiving the wake-up signal, each of the first devices is configured to transmit the HF light signal.

9. A system according to claim 1, wherein the controller is configured to, after adapting the receiving and/or transmitting direction of the receiving device:
   adapt a receiving opening angle of the receiving device, thereby adapting an extent of a field-of-view of the second device, in order to reduce interference of the HF light signal transmitted by the selected device from HF light signals transmitted by non-selected devices; and/or
   adapt a transmitting opening angle of the receiving device, thereby adapting a beam width of the second device, in order reduce interference at the non-selected first devices by the HF light signal transmitted by the second device.

10. A system according to claim 1, wherein the controller is configured to:
   detect that the second device has changed position;
   determine an updated position of the second device relative to each of the first devices and select an updated first device; and
   based on said determination of the updated position, adapt the receiving and/or transmitting direction of the second device toward the updated first device.

11. A system according to claim 10, wherein the controller is configured to perform said detection by:
   determining the updated position based on the respective identifiers encoded in the respective LF light signals received from each of the first devices; and/or
   receiving positional information from one or more accelerometers housed in the second device.

12. A receiving device comprising:
   a transceiver configured to receive a respective low-frequency, LF, light signal from a plurality of transmitting devices, wherein the LF light signal received from each transmitting device comprises a respective identifier of the transmitting device, and to receive and/or transmit a high-frequency, HF, light signal comprising data content, wherein the receiving device has an adaptable receiving and/or transmitting direction for respectively receiving and/or transmitting the HF light signal; and
   a controller configured to:
   based on the respective identifiers encoded in the respective LF light signals, determine a position of the receiving device relative to each of the transmitting devices, and select one of the first devices; and
   based on said determination, adapt the receiving and/or transmitting direction of at least the HF light signal of the receiving device toward the selected transmitting device
   and wherein the receiving device is configured to receive the LF light signal using a receiver having a wide receiving angle, and to receive the HF light signal using a receiver having a narrow receiving angle.

13. A method comprising:
   receiving, from each of a plurality of first devices, a respective low-frequency, LF, light signal comprising an identifier of a respective first device;
   based on the respective identifiers encoded in the respective LF light signals, determining a position of a second device relative to each of the first devices, wherein the second device comprises an adaptable receiving and/or transmitting direction for respectively receiving and/or transmitting a high-frequency, HF, light signal comprising data content, and selecting one of the first devices; and
   based on said determination, adapting the receiving direction and/or transmitting direction of at least the HF light signal of the second device toward the selected first device
   and wherein the second device is configured to receive the LF light signal using a receiver having a wide receiving angle, and to receive the HF light signal using a receiver having a narrow receiving angle.

14. A non-transitory computer program product comprising instructions which, when the program is executed by a receiving device, cause the receiving device to carry out the steps of claim 13.

* * * * *